United States Patent [19]
Egli

[11] 3,853,013
[45] Dec. 10, 1974

[54] CONTROL APPARATUS
[75] Inventor: Werner H. Egli, Minneapolis, Minn.
[73] Assignee: Honeywell Inc., Minneapolis, Minn.
[22] Filed: July 2, 1964
[21] Appl. No.: 381,292

[52] U.S. Cl. ............................................. 73/505
[51] Int. Cl. ........................................... G01p 3/26
[58] Field of Search ............ 73/407, 205, 174, 505, 73/194, 521, 387, 196; 74/5, 5.6

*Primary Examiner*—Herbert Goldstein

[57] ABSTRACT

A vortex rate sensor has two coaxial hollow chambers in the outlet passage. Aperatures in each chamber are located on opposite sides of a plane perpendicular to the chamber axis and including the axis of the outlet passage.

6 Claims, 4 Drawing Figures

PATENTED DEC 10 1974 3,853,013

INVENTOR.
WERNER H. EGLI

BY Roger W. Jensen
ATTORNEY

CONTROL APPARATUS

This invention pertains to fluid amplifiers and more particularly to vortex fluid amplifiers.

A vortex fluid amplifier comprises a device which functions to provide amplification of a fluid signal by means of a vortical fluid flow. The applicant's invention will be described as utilized in a specific embodiment of a vortex fluid amplifier referred to by those skilled in the art as a vortex rate sensor. However, the invention is by no means limited to such an application. The vortex rate sensor is an apparatus which is capable of sensing the angular velocity (rate) about an axis of a body upon which the vortex rate sensor is applied. The measurement of angular velocity (rate) is, as is well understood, useful and/or necessary in many control systems. For example, an angular rate signal is useful for control purposes in automatic flight and/or attitude control systems of aircraft and spacecraft.

Structurally, a vortex rate sensor generally comprises a means defining a cylindrical chamber including coupling means positioned around the periphery of the chamber. An exhaust passage is centrally positioned within the chamber. The sensor is adapted to be connected to a fluid source whereby a fluid flows from said fluid source through the coupling means, through the chamber, and exhausts through the exhaust passage.

In the absence of any rate input, the fluid flow through the chamber approximates the classical two-dimensional pure sink flow. Fluid flow in such a pure sink flow has only radial velocity. The term radial velocity is defined for purposes of this specification as meaning a velocity directed toward a center axis and is not limited to a direction perpendicular to the axis. When the sensor is subjected to a rate (angular velocity) input about an input axis, the coupling ring functions to couple this rate to the coupling element. Thus a tangential or rotational velocity is superimposed upon the radial velocity. The superimposition of the tangential velocity upon the radial velocity results in a vortical fluid flow, that is a fluid flow field in which the fluid streamline pattern is a spiral.

Due to the principle of conversation of angular momentum, the tangential velocity of the fluid will increase as the flow approaches the central outlet passage. Consequently, the vortex rate sensor possesses the unique and desirable characteristics of amplification of the parameter to be sensed (angular velocity) within the sensing device itself. Various amplificational levels may be obtained by varying the geometry of the vortex rate sensor.

A rate input superimpositions a tangential velocity upon the radial velocity of the fluid flowing through the rate sensor. Consequently, a measurement of the input rate may be obtained, by sensing the effect of the rate input upon the fluid flow field of the vortex rate sensor. However, it is extremely difficult in practice to sense the effect of the rate input upon the fluid flow field without destroying such effect. That is, it is extremely difficult to utilize a readout means which is capable of sensing the effect of a rate input upon the fluid flow field without disturbing the fluid flow field and thus losing the desired information.

The applicant provides a unique readout or pickoff means for sensing the effect of a rate input upon the fluid flow of a vortex rate sensor. More specifically, in one embodiment of the invention a cylindrical member having a pair of fluid cavities therein is positioned within the exit passage of the vortex rate sensor with its longitudinal axis perpendicular to the input axis of the vortex rate sensor. A narrow elongated aperture is provided within the cylindrical member in communication with each fluid cavity. With only radial flow within the fluid amplifier, the pressures in the two fluid cavities are substantially equal. However, when the fluid amplifier is subjected to an input rate, the effect upon the fluid flow field is sensed as a pressure differential in the two fluid cavities which is indicative of the applied input rate. Means are provided for sensing the pressure differential between the two fluid cavities.

The applicant's readout or pickoff means is much easier to manufacture, install, and calibrate than the prior art pickoff. In addition, the apertures within the member are positioned so as to lie out of the boundary layer of the fluid flow in the exhaust passage so that secondary layer flows are avoided. The applicant's unique pickoff means also provides a significant noise reduction in the output signal over the prior art devices because the dimensions of the aperture are designed so as to reduce cross flow within the pickoff means. Furthermore, because of the symmetrical shape of the member a greater linear range is obtained since there is no critical stall angle as there is when utilizing an airfoil pickoff.

The scope of the applicant's invention will become apparent from a study of the specification and claims in conjunction with the drawings in which:

Figure 1:
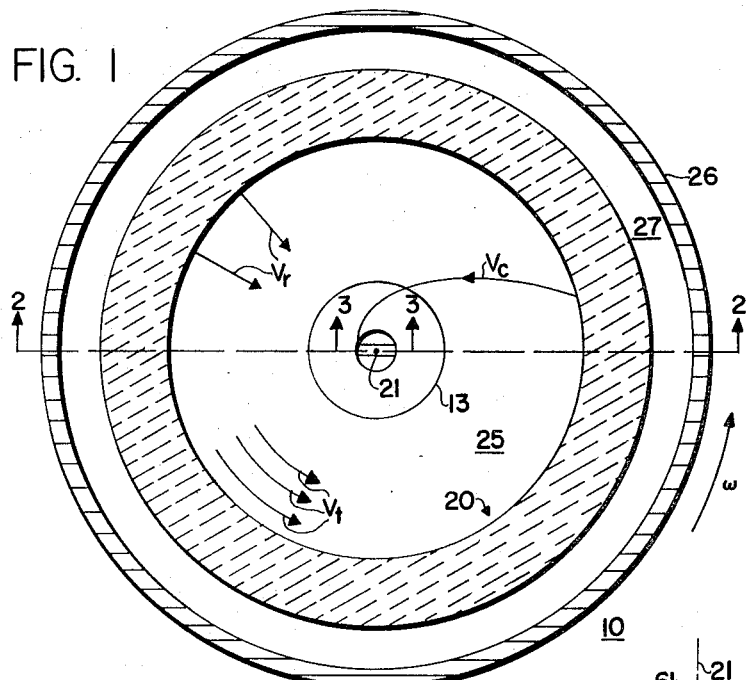
FIG. 1 is a cross sectional view of a vortex rate sensor taken along section line 1—1 of FIG. 2.
Figure 2:
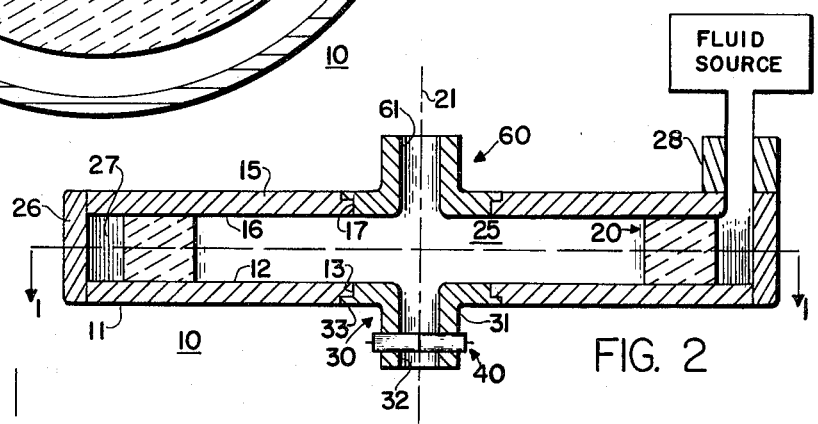
FIG. 2 is a cross sectional view taken along section line 2—2 of FIG. 1.

Referring now to FIGS. 1 and 2 reference numeral 10 generally depicts a vortex rate sensor. A cylindrical element 11 is provided having a plane surface 12 thereon. Element 11 has a central opening 13 therethrough having a circular cross section. A second cylindrical element 15 is provided having a plane surface 16 thereon. Element 15 has a central opening 17 therethrough having a circular cross section.

An annular porous coupling means 20 is positioned between plane surface 12 of element 11 and plane surface 16 of element 15. The term porous as utilized in this specification means permeable to fluids. Coupling means 20 is porous in nature so as to allow fluid to pass therethrough. Coupling means 20 is symmetrical about an axis 21. In one particular embodiment, porous coupling means 20 is constructed of sintered metal, however it is also possible to utilize other porous material such as screens, ceramics and the like. When the applicant's pickoff is utilized in conjunction with a vortex amplifier other than a rate sensor, fluid jets or other means are provided for introducing a component of fluid flow perpendicular to the axis of the exhaust passage. In the specific embodiment illustrated in FIGS. 1 and 2, coupling means 20 maintains plane surfaces 12 and 16 in a spaced relationship.

Plate elements 11 and 15 in conjunction with coupling means 20 collectively define a vortex chamber 25. The outer periphery chamber 25 is defined by porous coupling means 20. The ends of chamber 25 are defined by plane surface 12 of element 11 and plane surface 16 of element 15. It should be pointed out, that it is not necessary that vortex chamber 25 be a right cylinder as illustrated in FIGS. 1 and 2. A generally cylindrically shaped element 26 is positioned around the outer periphery of elements 11 and 15 enclosing the space therebetween. Element 26 is rigidly attached to elements 11 and 15 by suitable means (not shown) such as screws or adhesives. Element 26 is spaced apart from coupling means 20 and in conjunction therewith defines a manifold 27 between elements 11 and 15. Fluid is supplied to manifold 27 through a connector 28 which is connected to a fluid source.

A first exit element 30 is provided. Exit element 30 comprises a fluid conduit 31 having an exhaust or outlet passage 32 therethrough. Conduit 31 has a flange portion 33 on one end thereof which is positioned within opening 13 of element 11 so that the axis of passage 32 is substantially coaxial with axis 21. Exit element 30 is attached to element 11 by suitable means (not shown) such as adhesives or screws.

Figure 3:
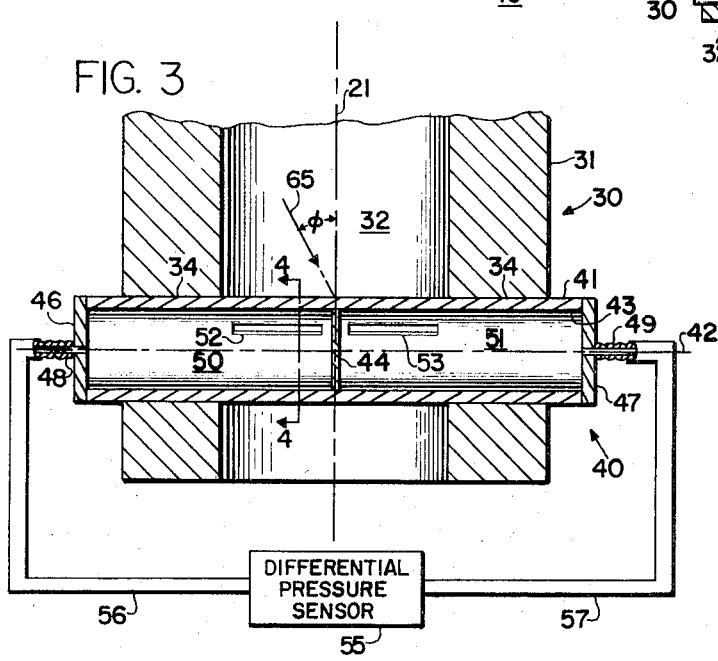
FIG. 3 is an enlarged cross sectional view taken along section line 3—3 of FIG. 1.

A unique readout or signal producing means is provided and is identified by reference numeral 40. Referring now to FIG. 3, in one specific embodiment readout means 40 comprises an elongated cylindrical element 41. The longitudinal axis of element 41 is identified by reference numeral 42. Element 41 is positioned within exit element 30 so that axis 42 is perpendicular to input axis 21 of fluid amplifier 10. More specifically, element 41 extends through two circular cross sectional shaped openings 34 in conduit 31 and extends across outlet passage 32. Element 41 has an elongated bore 43 therethrough symmetrical about axis 42. Bore 43 is divided or partitioned at its approximate axial midpoint by partition member 44. Readout means 40 is positioned within exit member 30 so that partition member 44 lies upon axis 21. End caps 46 and 47 are positioned on either end of element 41 so as to close bore 43. Fluid connector means 48 and 49 are provided within end caps 46 and 47 respectively.

Figure 4:
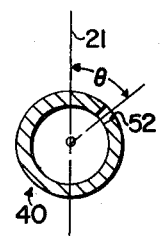
FIG. 4 is a cross sectional view taken along section line 4—4 of FIG. 3.

Partition member 44 divides bore 43 into a first and a second fluid cavity identified by reference numerals 50 and 51. A narrow elongated aperture 52 is provided within element 41 parallel to axis 42. Aperture 52 may be of various shapes, or a plurality of apertures may be utilized. It is not necessary that aperture 52 be parallel to axis 42. Aperture 52 provides communication between outlet passage 32 and fluid cavity 50. Aperture 52 is positioned at an angle $\theta$ with respect to a plane containing axis 42 and axis 21 (see FIG. 4). In the specific embodiment illustrated, $\theta$ equals approximately 45°. However, angle $\theta$ can be varied over a considerable range. Aperture 52 has a limited arcuate extent in the embodiment illustrated, however the arcuate extent can be varied over a considerable range. As the arcuate extent is reduced it reduces cross fluid flow within the pickoff means and reduces the noise in the output signal. A similar elongated aperture 53 is provided within element 41 parallel to axis 42 and aligned with aperture 52. It is not necessary that aperture 53 be parallel to axis 42 or aligned with aperture 52. Aperture 53 provides communication between outlet passage 32 and fluid cavity 51. Thus aperture 52 and apertures 53 are positioned within said passage on opposite sides of a plane perpendicular to axis 42 and including axis 21. Aperture 53 is likewise positioned at an angle $\theta$ with respect to a plane containing axis 42 and axis 21.

A differential pressure sensor 55 is provided. Pressure sensor 55 is connected across fluid cavities 50 and 51 so as to indicate the pressure differential therebetween. Pressure sensor 55 is connected to fluid pressure chamber 50 through connector 48 and conduit 56. Pressure sensor 55 is connected to fluid chamber 51 through connector 49 and conduit 57.

A second exit element 60 is provided which is identical to first exit element 30 with no pickoff means therein. Exit element 60 is positioned within the opening 17 in element 15. An outlet passage 61 is provided within exit element 60. Because of the similarity of exit element 60 and exit element 30 no further detailed discussion is deemed necessary. It should be noted that only one outlet passage is necessary for the operation of the fluid amplifier 10, and the applicant does not wish to be limited to the two outlet passage embodiments illustrated.

In operation, a fluid flows to manifold 27 from the fluid source. A pressure differential exists between manifold 27 and outlet passage 32 and 61 of exit elements 30 and 60. Consequently, a fluid flows from manifold 27 through coupling means 20, through chamber 25, and exhausts through passages 32 and 61. In the absence of any rate input (angular velocity about axis 21) the fluid flow field comprises only radial velocity as illustrated by radial vectors $V_r$ in FIG. 1. When vortex rate sensor 10 is subjected to an input rate, $\omega$, as indicated by the arrow in FIG. 1, coupling means 20 is also subjected to this rate. The fluid within coupling means 20 is given a tangential or rotational component of velocity as the fluid passes through the coupling means. The rotational or tangential component of velocity of the fluid is illustrated by vectors $V_t$ in FIG. 1. The superimposition of the tangential velocity upon the radial velocity results in a fluid flow field in which the fluid streamline pattern is a spiral $V_c$ as illustrated in FIG. 1. The fluid flowing through chamber 25 in the spiral pattern exhausts through outlet passages 32 and 61. This results in a fluid flow in passages 32 and 61 in the form of a helix. That is to say, the fluid flow has a component of longitudinal velocity parallel to axis 21 and a component of rotational velocity perpendicular to axis 24.

The tangential or rotational velocity $V_t$ imparted to the fluid within coupling means 20 by the rate input appears in passage 32 as the component of fluid flow having a velocity perpendicular to axis 21. The magnitude of the tangential or rotational velocity is amplified within the vortex rate sensor 10 and is indicative of the rate input. Consequently it is possible to sense the input rate $\omega$ by determining the sense and magnitude of the fluid flow perpendicular to axis 24.

With no input rate, the fluid flow in chamber 25 is radial velocity only and the fluid flow in passage 32 is longitudinal only, that is, parallel to axis 21. When the fluid flow is parallel to axis 21, fluid chambers 50 and 51 sense equal pressures. That is, the fluid flow impinging upon element 41 and passing through apertures 52 and 53 creates substantially equal pressure within fluid cavities 50 and 51. Consequently, there is no output signal from differential pressure sensor 55 in the absence of any rate input.

However when vortex rate sensor 10 is subjected to a rate input $\omega$, the fluid flows through passage 32 in a helix pattern and impinges upon element 41 at a helix angle $\theta$ relative to axis 21 as illustrated by arrow 65 in FIG. 3. It can be shown that helix angle $\theta$ is a function of the input rate $\omega$. The magnitude of the pressure differential between fluid cavities 50 and 51 is a function of the helix angle $\theta$. Consequently the pressure differential between fluid cavities 50 and 51 is indicative of the input rate $\omega$ when the fluid flow is held constant. With the counterclockwise rate input $\omega$ as illustrated in FIG. 1, fluid chamber 50 will have a greater pressure level than fluid chamber 51. With a clockwise rate input, fluid chamber 51 will have a greater pressure level than fluid chamber 50. Consequently, the sense of the applied input rate can be established by pickoff means 40. The magnitude of the pressure differential between fluid chambers 50 and 51 is indicative of the input rate.

Thus the applicant has provided a unique readout or pickoff means for a vortex fluid amplifier which is much easier to manufacture, install, and calibrate than previously known pickoff means. In addition, the applicant's unique pickoff means provides apertures which are positioned within the exit passage and spaced apart from the walls of the passage so as to avoid secondary boundary layer flows therein. The applicant's unique pickoff or readout means provides an output signal which contains substantially less noise than any previously known pickoff means. The low arcuate dimensions of the apertures reduce the cross flow within the pickoff means and contribute to the significant noise reduction in the output signal. The symmetrical shape of the applicant's unique pickoff means provides a greater linear range than heretofore obtainable because there is no critical stall angle for the pickoff means as in the prior art devices.

Although the invention has been described and illustrated in detail it is to be clearly understood that the same is by way of illustration and example only, and is not to be taken by way of limitation. The scope of this invention is limited only by the terms of the appended claims.

I claim as my invention:

1. In an apparatus of the class described: a first element having an opening therethrough; a second element; cylindrical porous coupling means positioned between said first and said second element thereby maintaining said first and said second elements in a substantially parallel spaced relationship; an exit element having a passage therethrough positioned within said opening of said first element, the axis of said passage being coaxial with the axis of said coupling means and defining an input axis, the apparatus being adapted to be connected to a fluid source whereby a fluid flows through said coupling means, between said first element and said second element, and exhausts through said passage of said exit element; pickoff means including a cylindrical member symmetrical about a longitudinal axis, said member having a bore therethrough, said bore being partitioned substantially at its axial midpoint to form a first and a second fluid cavity, said member having a first elongated aperture therein substantially parallel to the longitudinal axis, said first aperture being in communication with said first fluid cavity, said member having a second elongated aperture therein substantially parallel to the longitudinal axis and substantially aligned with said first aperture, said second aperture being in communication with said second fluid cavity, said member being positioned within said passage with the longitudinal axis perpendicular to the input axis and the midpoint of said member being positioned upon the input axis, said first aperture and said second aperture being positioned at an angle of 45° with a plane containing the input axis and the longitudinal axis; a differential pressure sensor; and means connecting said first fluid chamber and said second chamber to said differential pressure sensor, the pressure differential between said first fluid chamber and said second chamber being indicative of the component of fluid flow within said passage perpendicular to the input axis of said apparatus.

2. In an apparatus of the class described: a first element having an opening therethrough; a second element; annular porous coupling means positioned between said first and said second element thereby forming a vortex chamber symmetrical about an input axis; an exit element having a passage therethrough positioned within said opening of said first element, the axis of said passage of said exit element being positioned coaxial with said input axis, the apparatus being adapted to be connected to a fluid source whereby a fluid flows through said coupling means, through said vortex chamber, and exhausts through said passage of said exit element; readout means including a member symmetrical about a second axis, said member being positioned with said passage with the second axis perpendicular to the input axis, said member having a first cavity and a second cavity therein; said member having a first elongated aperture therein substantially parallel to the second axis, said first aperture being in communication with said first cavity and said passage, said member having a second elongated aperture therein substantially parallel to the second axis, said aperture being in connection with said second cavity and said passage, said first aperture and said second aperture being located within said passage on opposite sides of a plane perpendicular to said second axis and including said input axis, said first aperture and said second aperture being positioned at an angle with a plane containing the input axis and the second axis; means for sensing differential pressure; and means connecting said first cavity and said second cavity to said means for sensing differential pressure, the pressure differential between said first cavity and said second cavity being indicative of a component of fluid flow through said passage perpendicular to the input axis of said apparatus.

3. In apparatus of the class described: means forming a chamber symmetrical about a first axis including porous coupling means; an outlet passage in fluid communication with said chamber, the axis of said passage being substantially coaxial with the first axis; means for providing a flow of fluid through said coupling means, through said chamber, and exhausting through said passage; readout means including a member symmetrical about a second axis, said member extending across said passage with said second axis substantially perpendicular to said first axis, said element having a first cavity and a second cavity therein, said element having a first elongated aperture therethrough communicating with said first cavity and said passage, said element having a second elongated aperture therein communicating with said second cavity and said passage, said first aperture and said second aperture being positioned on opposite sides of a plane perpendicular to the second axis and including the first axis, said first aperture and said second aperture being located at an angle with a plane containing said first axis and said second axis; a differential pressure sensor; and means connecting said first cavity and said second cavity to said differential pressure sensor, the pressure differential between said first cavity and said second cavity being indicative of a component of fluid flow through said passage perpendicular to the input axis of said apparatus.

4. In an apparatus of the class described: means forming a chamber symmetrical about a first axis; an outlet passage in fluid communication with said chamber, the axis of said passage being substantially coaxial with said first axis; means for providing a flow of fluid through said chamber and exhausting through said passage substantially along said first axis; means for introducing a component of fluid flow perpendicular to said first axis; readout means including a member symmetrical about a second axis, said member extending across said passage with said second axis substantially perpendicular to said first axis, said element having a first fluid cavity and a second fluid cavity therein, said element having a first aperture therethrough in communication with said first cavity and said passage, said element having a second aperture therein in communication with said second cavity and said passage, said first aperture and said second aperture being positioned on opposite sides of a plane perpendicular to said second axis and including said first axis, said first aperture and said second aperture being located at an angle with a plane containing said first axis and said second axis; means for sensing differential pressure; and means connecting said first cavity and second cavity to said means for sensing differential pressure, the pressure differential between said first cavity and said second cavity being indicative of a component of fluid flow perpendicular to the input axis of said apparatus.

5. In an apparatus of the class described: means having a passage therein through which a fluid is adapted to flow substantially along the axis of said passage; means for introducing a component of fluid flow perpendicular to said axis of said passage; readout means including a member symmetrical about a second axis, said member extending across said passage with said second axis substantially perpendicular to said axis of said passage, said member having a first fluid cavity and a second fluid cavity therein, said member having a first aperture therein in communication with said first cavity and said passage, said member having a second aperture therein in communication with said second cavity and said passage, said first aperture and said second aperture being positioned on opposite sides of a plane perpendicular to said second axis and including said first axis, said first aperture and said second aperture being located at an angle with a plane containing said first axis and said second axis; differential pressure sensor; and means connecting said first cavity and said second cavity to said differential pressure sensor.

6. A sensor for providing a fluid pressure signal as a function of the vortical fluid flow component of a combined axial and vortical fluid flow in a fluid flow channel having a specified central longitudinal axis, said sensor comprising:
  a first hollow body having an interior chamber, said first hollow body being positioned in said channel in the path of said combined fluid flow;
  a sensor orifice defined in said first hollow body for providing fluid communication between the interior chamber therein and said channel, the sensor orifice in said first hollow body being directed generally toward said combined fluid flow and displaced from said central longitudinal axis;
  a second hollow body having an interior chamber, said second hollow body being positioned in said fluid channel coaxial with said first hollow body and in the path of said combined fluid flow;
  a sensor orifice defined in said second hollow body for providing fluid communication between the chamber therein and said channel, the sensor orifice in said second hollow body being directed generally toward said combined fluid flow and displaced from said central longitudinal axis in a sense opposite to the displacement from said central longitudinal axis of the sensor orifice in said first hollow body, whereby the sensor orifices in said first and second hollow bodies sense the angle of attack of said vortical flow and thereby generate fluid pressures in the chambers in said first and second hollow bodies proportional to said vortical fluid flow.

* * * * *

UNITED STATES PATENT OFFICE
CERTIFICATE OF CORRECTION

PATENT NO. : 3,853,013
DATED : December 10, 1974
INVENTOR(S) : WERNER H. EGLI

It is certified that error appears in the above-identified patent and that said Letters Patent are hereby corrected as shown below:

Claim 2, line 23, cancel "connection" and substitute --communication--.

Signed and sealed this 6th day of May 1975.

(SEAL)
Attest:

RUTH C. MASON
Attesting Officer

C. MARSHALL DANN
Commissioner of Patents
and Trademarks